May 15, 1923.  1,455,408
A. W. OLSON
NONSKIDDING DEVICE
Filed March 1, 1922
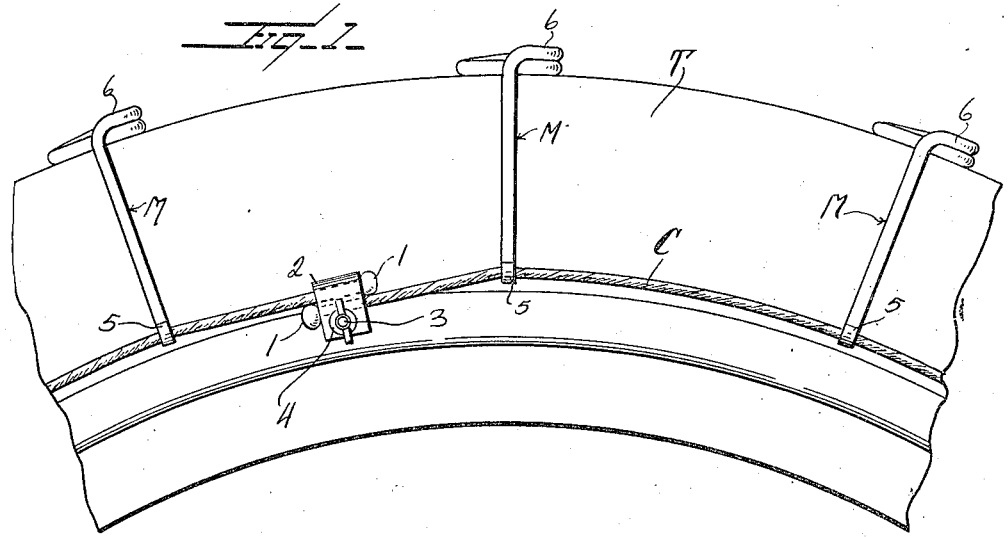
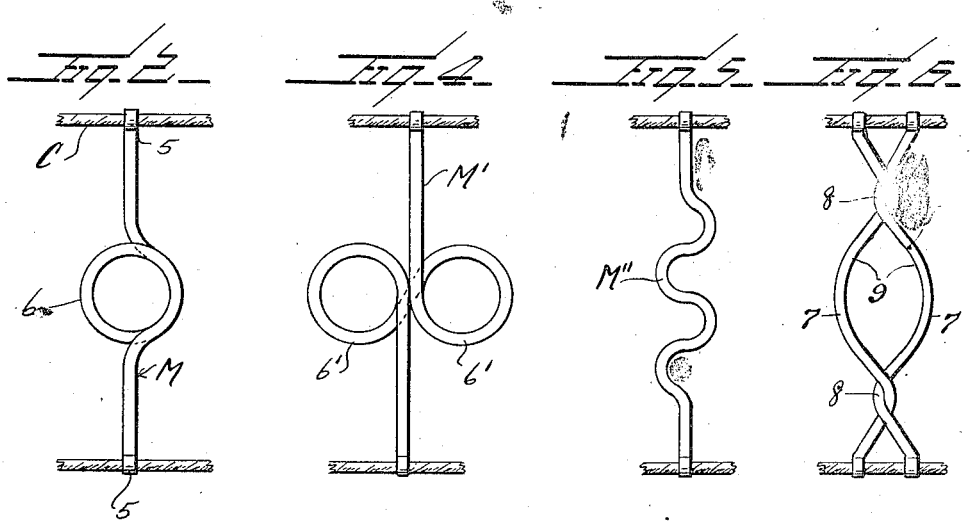
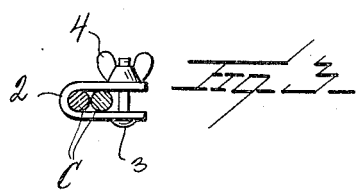
Inventor
A. W. Olson
By Watson E. Coleman
Attorney Patented May 15, 1923.

1,455,408

UNITED STATES PATENT OFFICE.

ADOLPH W. OLSON, OF McINTOSH, MINNESOTA.

NONSKIDDING DEVICE.

Application filed March 1, 1922. Serial No. 540,250.

*To all whom it may concern:*

Be it known that I, ADOLPH W. OLSON, a citizen of the United States, residing at McIntosh, in the county of Polk and State of Minnesota, have invented certain new and useful Improvements in Nonskidding Devices, of which the following is a specification, reference being had to the accompanying drawings.

This invention relates to certain improvements in non-skidding devices and it is an object of the invention to provide a novel and improved device of this general character which may be readily and conveniently applied to a wheel and which provides means to effectually prevent skidding or slippage.

Another object of the invention is to provide a novel and improved device of this general character wherein the side members each constitutes a steel cable and is, therefore, non-stretchable and at the same time permits the completed device, when not in use, to be rolled or compacted to occupy a minimum of space.

An additional object of the invention is to provide a novel and improved device of this general character wherein each of the tread members or units is formed of a metallic rod or member bendable to provide means to effectively resist skidding or slippage.

The invention consists in the details of construction and in the combination and arrangement of the several parts of my improved non-skidding device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in side elevation of a non-skidding device constructed in accordance with an embodiment of my invention;

Figure 2 is a fragmentary view in plan illustrating in detail one of the tread members or units as disclosed in Figure 1;

Figure 3 is a fragmentary view partly in section and partly in elevation illustrating the means for connecting the coacting extremities of the side member;

Figure 4 is a fragmentary view in plan illustrating the tread member or unit constructed in accordance with a further embodiment of my invention;

Figure 5 is a fragmentary view similar to Figure 4, illustrating a still further embodiment of a tread member or unit;

Figure 6 is also a view similar to Figure 4 but illustrating a still further embodiment of tread member or unit;

My improved device as herein disclosed comprises the side members C formed of steel cables of requisite length, each of said cables having its opposite end portions provided with a ball or head 1 soldered or otherwise secured thereto. By employing the steel cables, the disadvantages of the side members stretching is eliminated and at the same time the device in its entirety, when not in use, can be readily rolled or compacted to occupy a minimum of space.

When the side members C are in applied position, the extremities thereof overlap, said overlapping portions being disposed through a spring clip 2 substantially U-shaped in form with a ball or head 1 at opposite sides of said clip.

Disposed through the side members of the clip 2 is a bolt 3 with which is associated a wing nut 4 so that, upon proper rotation of the nut 4, the clip 2 may be brought into tight contact with the extremities of the side members C. The balls or heads 1 provide an effective means to prevent the extremities of the cables from pulling outwardly through the clip 2.

When the nut 4 is rotated in a direction to move away from the clip 2, said clip will expand sufficiently to permit the balls or heads 1 to readily pass therethrough in either applying or removing the non-skid device.

At substantially equidistantly spaced points therealong the side members C are connected by the tread members or units M of such configuration to straddle the tire T of the wheel structure. Each of the members or units M comprises a metallic rod bent into a substantially U-shape with the extremities returned, as at 5, to provide eyes through which the side members pass. The returned portions 5 are tightly engaged with the side members C so that the member or unit M is held against movement lengthwise of said side members C.

Each of the tread members or units M has its central portion coiled to provide a loop 6 which, when the device is in applied position, is disposed at the central or tread portion of the tire T and this loop serves effectually to prevent skidding or slippage.

It is also to be understood that each of the members or units M is of such size as to loosely or freely straddle the tire T so that said member or unit M will not pinch or stick to the tire or otherwise injure the same.

In Figure 4 is illustrated a tread member or unit M' wherein the central portion is coiled or twisted to provide a pair of loops 6', the same, when the member or unit is in applied position, being disposed circumferentially of the tire.

In Figure 5, the tread member or unit M" comprises a spirally bent rod.

In the embodiment of my invention illustrated in Figure 6, the tread member or unit U comprises two metallic rods 7 having their opposite extremities terminating in hook members for connection with the side members while intermediate portions of said rods 7 are twisted one around the other, as at 8, to provide a central loop 9.

From the foregoing description it is thought to be obvious that a non-skidding device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A non-skidding device comprising side members and tread members connecting said side members, each of said tread members comprising a single length of material provided with a coil at its central portion to overlie the central portion of the tread of the tire when the device is in applied position.

2. A non-skid device comprising side members, and tread members connecting said side members, each of said tread members comprising a single length of material provided with oppositely directed loops at the central portion.

In testimony whereof I hereunto affix my signature.

ADOLPH W. OLSON.